United States Patent [19]

Segerpalm et al.

[11] Patent Number: 5,342,238
[45] Date of Patent: Aug. 30, 1994

[54] AIR FILTERING APPARATUS

[76] Inventors: Hans Segerpalm, August Sodermans Vag 4, S-126 54 Hägersten; Ante Eklund, Rolsta Frolunda, S-186 95 Vallentuna, both of Sweden

[21] Appl. No.: 955,895
[22] PCT Filed: Jun. 4, 1991
[86] PCT No.: PCT/SE91/00394
   § 371 Date: Oct. 29, 1992
   § 102(e) Date: Oct. 29, 1992
[87] PCT Pub. No.: WO91/19617
   PCT Pub. Date: Dec. 26, 1991

[30] Foreign Application Priority Data

Jun. 19, 1990 [SE] Sweden ............... 9002179-1

[51] Int. Cl.⁵ .................... B60H 3/06; B60J 7/08
[52] U.S. Cl. .................... 454/136; 454/139; 454/158
[58] Field of Search ............ 454/139, 158, 129, 136, 454/137

[56] References Cited

U.S. PATENT DOCUMENTS

| 3,401,620 | 9/1968 | Armstrong et al. | 454/136 |
| 3,657,992 | 4/1972 | Minnick, Jr. | 454/136 |
| 4,038,911 | 8/1977 | Hart . | |
| 4,193,339 | 3/1980 | Giles . | |
| 4,709,623 | 12/1987 | Roth et al. | 454/136 X |
| 4,800,803 | 1/1989 | Farmont . | |
| 4,895,065 | 1/1990 | Lamparter | 454/136 |
| 5,003,866 | 4/1991 | Ricci | 454/136 X |

FOREIGN PATENT DOCUMENTS

| 480667 | 2/1977 | Australia . | |
| 3643436 | 2/1988 | Fed. Rep. of Germany . | |
| 79010 | 6/1981 | Japan | 454/139 |
| 147918 | 9/1982 | Japan | 454/137 |
| 132408 | 6/1986 | Japan | 454/137 |

Primary Examiner—Harold Joyce
Attorney, Agent, or Firm—Sughrue, Mion, Zinn, Macpeak and Seas

[57] ABSTRACT

An arrangement for filtering the air entering the interior of a vehicle, particularly the interior of a car, includes a coarse filter, a fan unit and a fine-filtering unit. The whole of the arrangement is combined to form a unit which can be fitted to the vehicle in the manner of a conventional, openable roof hatch (b 2). When closed, the hatch has a rear part which projects above the roof of the vehicle and which includes an ambient air intake opening (3) in which the coarse filter is mounted. The hatch also includes a vehicle interior air intake opening (9), a shutter (11) for closing the ambient air intake opening and the interior air intake opening to a desired extent, and at least one outlet opening (8) through which filtered air is blown into the vehicle interior.

5 Claims, 2 Drawing Sheets

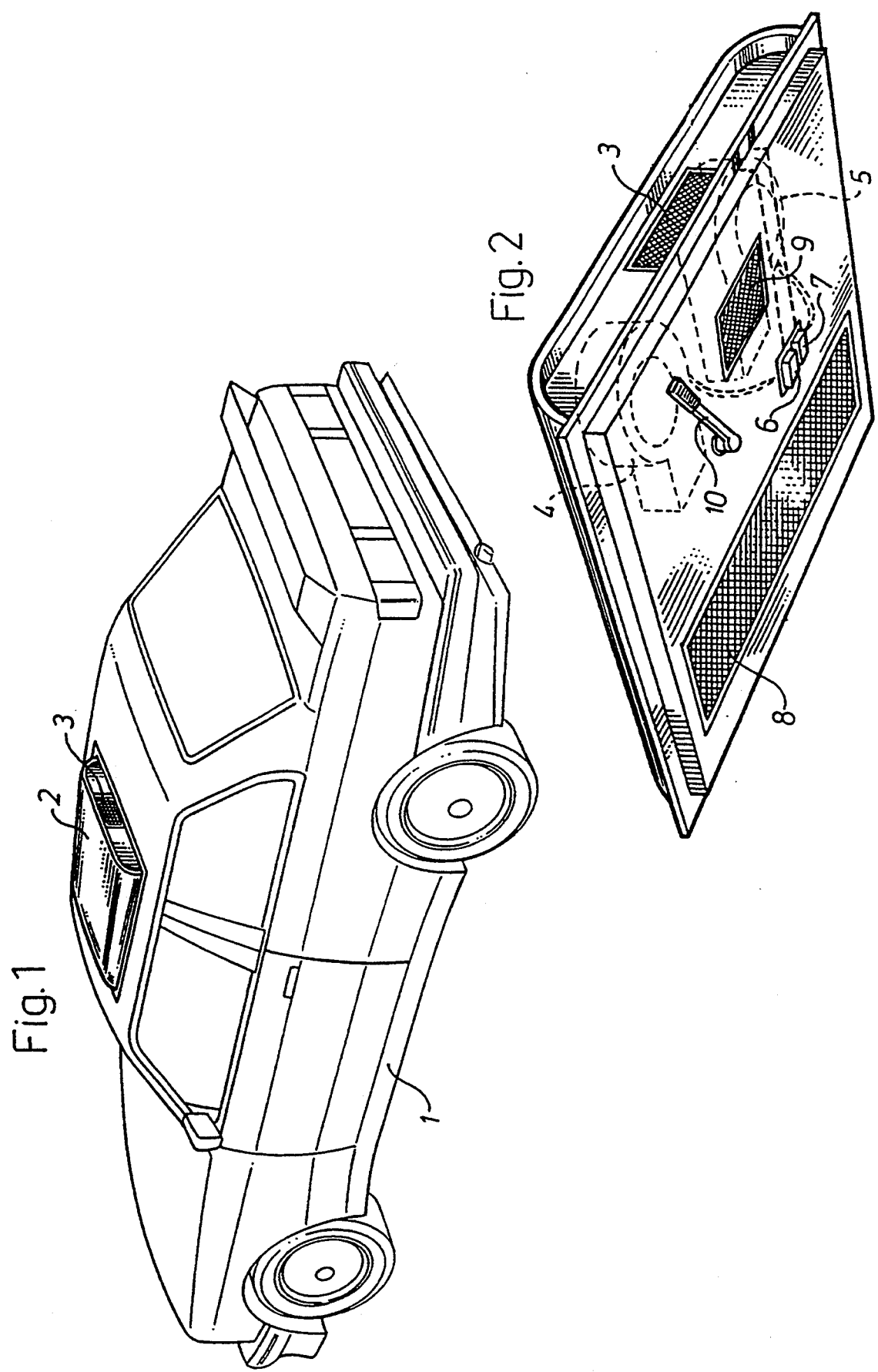

AIR FILTERING APPARATUS

BACKGROUND OF THE INVENTION

The present invention relates to a vehicle-interior air filtering apparatus, particularly an air filtering apparatus for the interior of cars, comprising a coarse filter, a fan unit and a fine filtering unit.

When the vehicle is moving, the volume of air draw into the vehicle may be in the order of 15 m$^3$ per minute. This air will contain pollen, various types of dust, and vehicle-exhaust particles. The air is normally drawn into the vehicle by suction from a location about 60 cm above the road surface on which the vehicle is moving and normally passes solely through a coarse filter in which large particles are extracted from the air flow. Assays have shown that, in the case of town traffic, the air is about 70% purer at a height of 120 cm above the road surface than at a height of 60 cm above said surface.

Consequently, it would be beneficial to take air into the vehicle interior from a greater height above the road surface. Many cars and other types of vehicles are equipped with roof hatches (or sliding roofs). However, in order to avoid draughts, these roof hatches are constructed so that no appreciable inflow of air is obtained, not even when the hatch is open. Furthermore, the air which does enter through the hatch is not filtered.

SUMMARY OF THE INVENTION

The main object of the present invention is to provide an arrangement which can be readily fitted to an automotive vehicle, such as a car, and also to existing automotive vehicles, and which will take-in ambient air, and filter said air, from a location at the greatest possible height above the road surface, and which can also be used to filter the air present in the vehicle interior, and which will also function as a conventional roof hatch, or sliding roof.

This object is achieved in accordance with the invention by combining a fan and a filter unit in a roof hatch construction which can be mounted conventionally in the roof of a car for instance and which is connected to the electrical system of the automobile. Since the roof hatch can be openable in a conventional manner, there is obtained a combination of the following three advantages, among other things:

The arrangement can be used to take-in ambient air from a high height above the road surface, and filter said air;

The arrangement can be used to filter and recycle the air present in the vehicle interior; and The arrangement can be used as a conventional roof hatch when so desired.

Furthermore, all of these three functions can be combined selectively.

The particular characteristic features of the inventive arrangement are set forth in the following Claims.

Since the inventive arrangement can be fitted to a vehicle with the aid of techniques which have been well tested in the installation of conventional roof hatches, the arrangement can be fitted readily at comparatively low costs. The arrangement can also be constructed so as not to be bound to any particular make of vehicle.

BRIEF DESCRIPTION OF THE DRAWINGS

The invention will now be described in more detail with reference to an exemplifying embodiment thereof illustrated in the accompanying drawings, in which FIG. 1 illustrates generally a car fitted with an arrangement constructed in accordance with the invention;

FIG. 2 illustrates the inventive arrangement, obliquely from beneath; and

DETAILED DESCRIPTION OF THE PREFERRED EMBODIMENT

Figure 3:
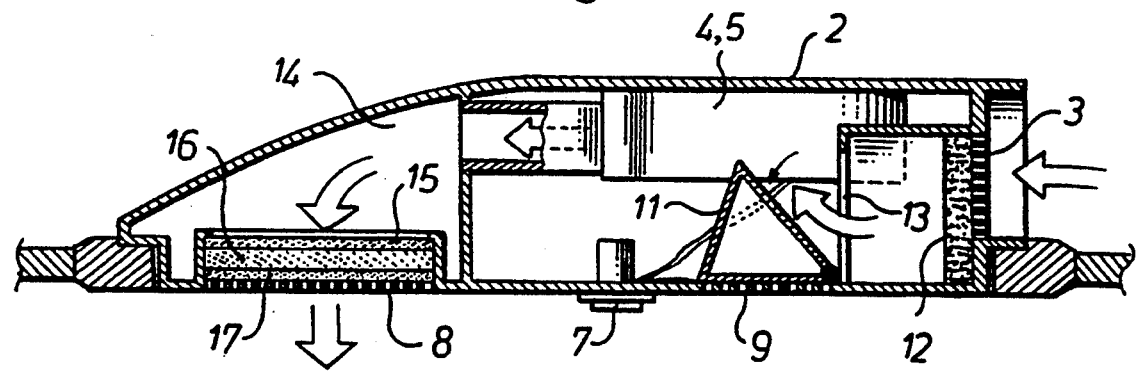
FIGS. 3–5 are sectional views of the arrangement shown in FIG. 2, showing different functional states of the arrangement.

FIG. 1 illustrates a car 1 equipped with a roof hatch 2 which is modified in accordance with the invention and which, in addition to its function as a roof hatch, can also be used to blow filtered ambient air into the vehicle interior and to recycle and filter the air present in said interior. The hatch 2 is pivotally mounted in a conventional manner on a pivot axle provided at the forward edge of the hatch, so as to enable the hatch to be opened by swinging the rearward part of the hatch upwards to the extent desired. Alternatively, the hatch may be slidably mounted in guide rails fitted to the roof of the vehicle.

As will be seen also from FIG. 2, the rear part of the hatch, which projects above the vehicle roof, is provided with an ambient-air intake opening 3, which in the case of the illustrated embodiment communicates with two fan units 4, 5 which are controlled by means of associated switches 6 and 7 respectively and which function to blow filtered air present in the vehicle interior through an outlet opening or vent 8. The reference 9 identifies an opening through which air present in the vehicle interior can be withdrawn from the interior with the aid of the fans, this air being filtered and subsequently returned to the vehicle interior, through the opening 8. The reference 10 identifies a schematically illustrated operating handle which operates a shutter mechanism 11, by means of which the exposed areas of the suction openings 3 and 9 can be adjusted as desired.

FIG. 3 illustrates the hatch 2 in its closed position, in which the shutter mechanism 11 is set to a position in which the suction opening 3 is fully open and the suction opening 9 is closed. In this case, ambient air is drawn in through the opening 3, by means of the fan units 4, 5, and passes through a coarse filter 12 and an opening 13, which has been exposed by the shutter mechanism 11. The air drawn in through the opening 3 is then forced-out by the fans 4, 5 into a distribution chamber 14, from where the air is blown into the vehicle interior through the opening 8, subsequent to being filtered in a filter unit comprising a pre-filter 15, a carbon filter 16 and a microfilter 17. These filters can be constructed in a known manner, such that the air blown into the vehicle interior will be extremely clean. The filters are preferably mounted in a cassette, such as to enable the filter components to be cleaned and replaced when necessary.

Figure 4:
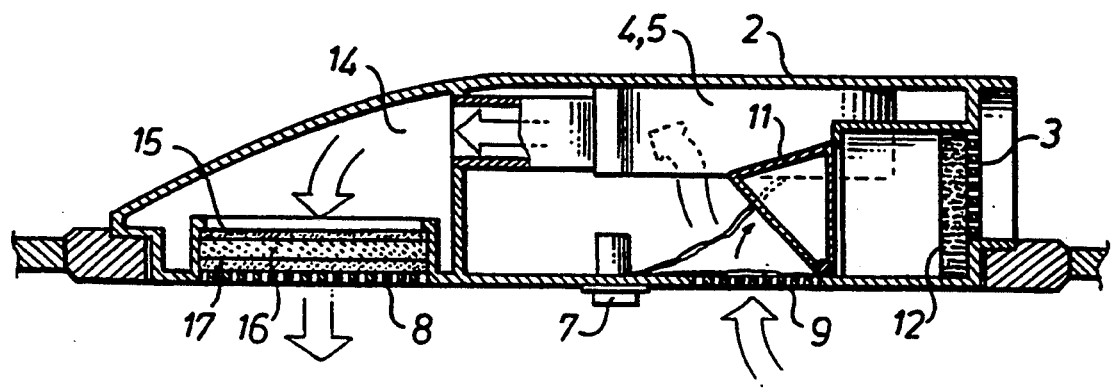

FIG. 4 illustrates the use of an inventive arrangement for recycling and filtering the air in the interior of a vehicle. In the illustration of FIG. 4, the shutter mechanism 11 has been adjusted to a setting in which the shutter obstructs the ingress of ambient air while the opening 9 facing towards the vehicle interior is fully open. The interior air is cleansed effectively from smoke and other contaminents when the shutter mechanism is set to this particular setting. Naturally, the shutter mechanism 11 can also be set to an intermediate position in which a given quantity of fresh air can be admixed with the air present in the vehicle interior.

Figure 5:
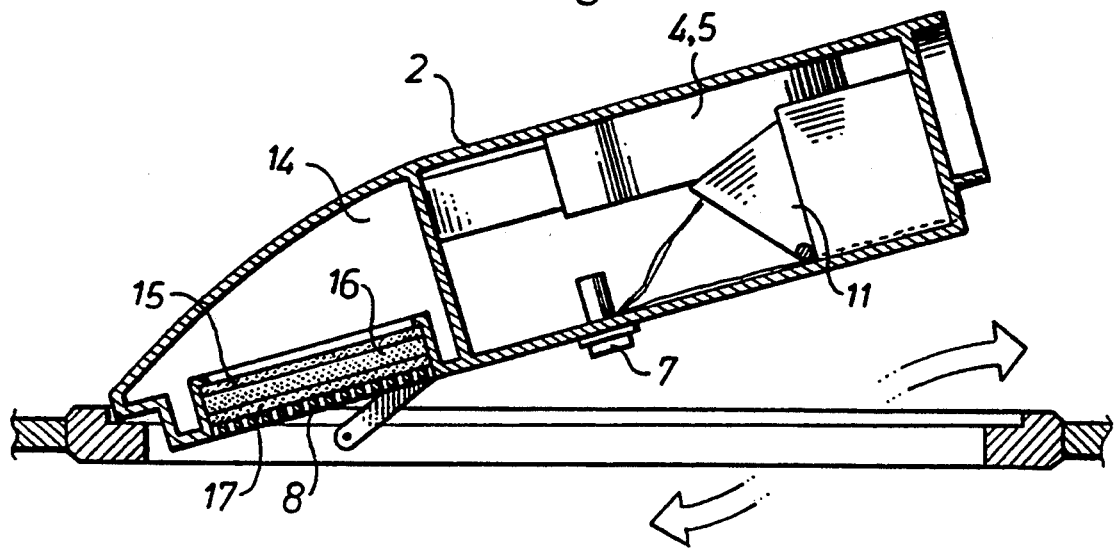

FIG. 5 illustrates the case where an inventive arrangement is used as a conventional, pivotable roof hatch, wherein ambient air is able to enter the vehicle interior directly through the roof opening. Electric current can be supplied to the fan motors with the aid of switches or electrical contacts mounted on the rear edge of the hatch and activated or deactivated automatically when the hatch is opened.

One important advantage afforded by an arrangement constructed in accordance with the invention and operative in supplying cleansed air to the interior of a vehicle or/and cleansing the air present in said vehicle interior is that the arrangement can be fitted to the vehicle with the aid of tested and well-developed techniques, since the arrangement can be fitted in the same manner as conventional roof hatches, or sliding roofs. Furthermore, the inventive arrangement retains the conventional roof hatch function. Consequently, one and the same roof-hatch construction can be used for different makes of vehicles.

Although not shown, the inventive arrangement can also be provided with conventional devices for heating and/or cooling the air entering the vehicle interior, so as to obtain a desired climate therein.

Although the invention has been described with reference to an exempliyfing embodiment thereof illustrated in the drawings, it will be understood that this embodiment can be modified in several respects within the scope of the Claims. For example, the illustrated fans can be replaced with some other suitable fan unit and the schematically illustrated shutter mechanism can be replaced with other devices for controlling the effective area of the suction openings.

We claim:

1. An automotive vehicle interior air-filtering arrangement, comprising: a coarse filter (12), a fan unit (4, 5), and a fine-filtering unit (15-17), wherein said arrangement is disposed in a unit adapted to be mounted to a roof of the vehicle in the manner of a conventional, openable roof hatch (2); said hatch having, when closed, a rear part projecting upwardly above a roof of the vehicle and which includes an ambient air intake opening (3) in which said coarse filter is mounted; said hatch also including an interior air intake opening (9) communicating with the vehicle interior, means (11) for closing the ambient air intake opening and the interior air intake opening to desired extents, and at least one outlet opening (8) through which filtered air is blown by the fan unit into the vehicle interior.

2. An arrangement according to claim 1, wherein said means for closing the intake openings (3, 9) includes a closure element pivotable between said two openings.

3. An arrangement according to claim 1, wherein said fine-filtering unit (15-17) is mounted between the fan unit (4, 5) and said outlet opening (8).

4. An arrangement according to claim 3, wherein the fine-filtering unit includes a pre-filter (15), a carbon filter (16) and a microfilter (17).

5. An arrangement according to claim 1, wherein the hatch (2) is pivotable about a pivot axis mounted on the forward end of the hatch.

* * * * *